United States Patent
Gedik et al.

(10) Patent No.: US 8,941,667 B2
(45) Date of Patent: Jan. 27, 2015

(54) METHOD AND APPARATUS FOR FRAME INTERPOLATION

(75) Inventors: Osman Serdar Gedik, Ankara (TR); Abdullah Aydin Alatan, Ankara (TR)

(73) Assignee: Vestel Elektronik Sanayi ve Ticaret A,S., Manisa (TR)

( * ) Notice: Subject to any disclaimer, the term of this patent is extended or adjusted under 35 U.S.C. 154(b) by 822 days.

(21) Appl. No.: 12/696,401

(22) Filed: Jan. 29, 2010

(65) Prior Publication Data

US 2010/0245372 A1    Sep. 30, 2010

Related U.S. Application Data

(60) Provisional application No. 61/148,291, filed on Jan. 29, 2009.

(51) Int. Cl.
| | |
|---|---|
| *G06T 11/00* | (2006.01) |
| *H04N 5/14* | (2006.01) |
| *H04N 7/01* | (2006.01) |
| *G06T 3/40* | (2006.01) |
| *G06T 7/20* | (2006.01) |
| *H04N 13/00* | (2006.01) |

(52) U.S. Cl.
CPC ............. *G06T 3/4007* (2013.01); *G06T 7/2033* (2013.01); *H04N 7/0137* (2013.01); *H04N 13/0011* (2013.01); *G06T 2207/20144* (2013.01); *H04N 7/0127* (2013.01)
USPC ........................... 345/475; 348/443; 348/699

(58) Field of Classification Search
CPC ................................................ H04N 19/00593
USPC ........................................................ 345/475
See application file for complete search history.

(56) References Cited

U.S. PATENT DOCUMENTS

| | | |
|---|---|---|
| 6,151,075 A | 11/2000 | Shin |
| 6,192,079 B1 | 2/2001 | Sharma |
| 6,229,570 B1 | 5/2001 | Bugwadia |
| 6,438,275 B1 | 8/2002 | Martins |
| 6,442,203 B1 | 8/2002 | Demos |
| 6,487,304 B1 | 11/2002 | Szeliski |
| 6,621,864 B1 | 9/2003 | Choo |
| 6,985,126 B2 | 1/2006 | Hoppenbrouwers |

(Continued)

OTHER PUBLICATIONS

A. A. Alatan and L. Onural, "Utilization of 3-D Motion Models in Video Coding: Occlusion Detection and Motion Compensated Temporal Interpolation", Advances in Digital Image Communiaction, Proceedings of 2nd Erlangen Symposium, pp. 85-92, Erlangen, Germany, Apr. 1997.*

(Continued)

*Primary Examiner* — Kee M Tung
*Assistant Examiner* — Zhengxi Liu
(74) *Attorney, Agent, or Firm* — Conley Rose, P.C.

(57) ABSTRACT

The invention generally provides a method and apparatus for up-converting the frame rate of a digital video signal, the method comprising: receiving a digital video signal containing a first frame and a second frame; finding in one of the received frames, matches for objects in the other of the received frames; utilizing 3 dimensional position data in respect of the objects within the frames to determine 3 dimensional movement matrices for the matched objects; using the 3 dimensional movement matrices, determining the position of the objects in a temporally intermediate frame and thereby generating an interpolated frame, temporally between the first and second frame.

24 Claims, 3 Drawing Sheets

(56) References Cited

U.S. PATENT DOCUMENTS

2006/0248437 A1* 11/2006 Tiirola et al. .................. 714/822
2008/0263621 A1* 10/2008 Austerlitz et al. ............ 725/139

OTHER PUBLICATIONS

Weng, J.; Ahuja, N.; Huang, T.S.;, "Optimal motion and structure estimation," Computer Vision and Pattern Recognition, 1989. Proceedings CVPR '89., IEEE Computer Society Conference on, vol., No., pp. 144-152, Jun. 4-8, 1989.*
Cigla, C.; Zabulis, X.; Alatan, A.A.;, "Region-Based Dense Depth Extraction from Multi-View Video," Image Processing, 2007. ICIP 2007. IEEE International Conference on, vol. 5, No., pp. V-213-V-216, Sep. 16, 2007-Oct. 19, 2007.*
Young, G.-S.J.; Chellappa, R.;, "3-D motion estimation using a sequence of noisy stereo images: models, estimation, and uniqueness results," Pattern Analysis and Machine Intelligence, IEEE Transactions on, vol. 12, No. 8, pp. 735-759, Aug. 1990.*
Gordon, G.; Darrell, T.; Harville, M.; Woodfill, J.;, "Background estimation and removal based on range and color," Computer Vision and Pattern Recognition, 1999. IEEE Computer Society Conference on., vol. 2, No., pp. 2 vol. (xxiii+637+663), 1999.*
Vedula, S. 1999. Multi-view spatial and temporal interpolation for dynamic event visualization. Technical Report CMU-RI-99-15, The Robotics Institute, Carnegie Mellon University, Pittsburgh.*
Ye Zhang; Kambhamettu, C.;, "On 3-D scene flow and structure recovery from multiview image sequences," Systems, Man, and Cybernetics, Part B: Cybernetics, IEEE Transactions on, vol. 33, No. 4, pp. 592-606, Aug. 2003.*
Harville, M.; Gordon, G.; Woodfill, J.;, "Foreground segmentation using adaptive mixture models in color and depth," Detection and Recognition of Events in Video, 2001. Proceedings. IEEE Workshop on, vol., No., pp. 3-11, 2001.*
Martin A. Fischler and Robert C. Bolles. 1981. Random sample consensus: a paradigm for model fitting with applications to image analysis and automated cartography. Commun. ACM 24, 6 (Jun. 1981), 381-395.*

* cited by examiner

METHOD AND APPARATUS FOR FRAME INTERPOLATION

CROSS-REFERENCE TO RELATED APPLICATION

This application claims the benefit of priority to U.S. application Ser. No. 61/148,291, filed Jan. 29, 2009, the content of which is hereby incorporated by reference in its entirety for all purposes.

STATEMENT REGARDING FEDERALLY SPONSORED RESEARCH OR DEVELOPMENT

Not applicable.

BACKGROUND OF THE INVENTION

Field of Invention

The invention generally relates to a method and apparatus for frame interpolation.

BRIEF SUMMARY OF THE PREFERRED EMBODIMENTS

A video is made up of plural frames, each frame being a still image, the effect of showing consecutive frames being to give the impression of movement. The frame rate of videos is generally sufficiently high such that a viewer cannot perceive the individual frames but rather perceives a continuous moving image.

On some television displays it is desirable to increase the frame rate from that at which the video being displayed was originally captured. This can be due to increase frame rate requirement for display in accordance with a different standard from that at which the video was captured.

Many of the latest high-performance television sets, particularly large screen and wide screen (16:9 format) versions, use a 100 Hz screen refresh rate instead of the conventional 50 Hz refresh rate. This is primarily to avoid screen flicker, which becomes more perceptible and annoying to the viewer as the screen size increases. However, standard television broadcast transmissions only contain 50 frames per second. Therefore if television is being watched on one of the latest high-performance television sets, the frame rate must somehow be doubled.

Such increase in frame rate is referred to as frame rate up-conversion. Frame rate up-conversion is used to eliminate large areas of flicker on a television screen. Motion judder is another problem that can arise in such situations with some types of up-conversion that are currently used.

While up-converting, i.e. subjecting a video to up-conversion, new interpolated frames are added to the original or source video stream. Typically, one interpolated frame is determined and added temporally between two existing frames. A known method for achieving this up-conversion or frame interpolation is to show each original frame twice. This is an acceptable solution in static regions but problems occur in moving areas of the displayed video. The problems are referred to as "motion judder" and blur and they cause degradation in visual quality which is undesirable.

Our co-pending European patent application having publication number EP-A-1,863,283 discloses a method by which frame rate up-conversion may be achieved. In this application, a method and an apparatus is described in which moving objects within a frame are identified, i.e. objects that appear as moving objects within the sequence of frames including the frame in question. The or each identified moving objects is segmented. Once this has been done, motion parameters are determined for each of the identified objects.

The reduction of motion blur caused by finite response time of the crystal cells and the hold-type characteristic of panel displays is best solved by increasing the frame rate using motion estimation and compensation techniques.

Frame rate up-conversion can be computationally complex. This is particularly so in multiview applications, i.e. video sequences recorded simultaneously from multiple cameras, each producing its own "view" of the scene. If a receiver is to upconvert all of these views then the computational resources required will be significant. Hence, there is a need for the development of frame rate up-conversion methods and apparatuses for the next generation of multiview panel displays. Multiview panel displays are capable of displaying all the captured views of the scene, one at a time depending on the user's choice, referred to as free-view TV or simultaneously, referred to as 3D TV. In the former case, the user can watch the scene at any desired view point, whereas in the latter case, the users have the depth impression as well.

There are many available methods and algorithms for increasing the frame rates of conventional single (mono) view videos by using two-dimensional (2D) motion parameters. In addition to the co-pending European patent application referred to above, methods and apparatuses for conventional view video frame rate up-conversion are disclosed in each of U.S. Pat. Nos. 6,151,075, 6,229,570, 6,192,079, 6,438,275, 6,442,203, 6,621,864 and 6,985,126.

U.S. Pat. No. 6,487,304 discloses a method for computing motion or depth estimates from multiple images by associating a depth or motion map with each input image.

According to the first aspect of an embodiment of the invention, there is provided a method of up-converting the frame rate of a digital video signal, the method comprising: receiving a digital video signal containing a first frame and a second frame; finding in one of the received frames, matches for objects in the other of the received frames; utilising 3D data in respect of the objects within the frames to determine 3 dimensional movement matrices for the matched objects; using the 3D movement matrices, determining the position of the objects in a temporally intermediate frame to enable the generation of an interpolated frame, temporally between the first and second frame.

In an embodiment, the method comprises determining the 3D position data in respect of the objects within the frames using a calibration matrix in respect of a camera used to capture the frame and a depth map of the frame.

In an embodiment, the 3D movement matrices comprise a 3D rotation matrix R and a 3D translation matrix t.

In an embodiment, the matrices are estimated using a formula of the following form:

$$\begin{bmatrix} X_{11} & Y_{11} & Z_{11} & 0 & 0 & 0 & 0 & 0 & 0 & 1 & 0 & 0 \\ 0 & 0 & 0 & X_{11} & Y_{11} & Z_{11} & 0 & 0 & 0 & 0 & 1 & 0 \\ 0 & 0 & 0 & 0 & 0 & 0 & X_{11} & Y_{11} & Z_{11} & 0 & 0 & 1 \\ \cdots & & & & & & & & & & & \end{bmatrix} \begin{bmatrix} R_{11} \\ R_{12} \\ R_{13} \\ R_{21} \\ R_{22} \\ R_{23} \\ R_{31} \\ R_{32} \\ R_{33} \\ t_1 \\ t_2 \\ t_3 \end{bmatrix} =$$

$$\begin{bmatrix} X_{21} \\ Y_{21} \\ Z_{21} \\ \ldots \end{bmatrix}$$

in which $(X_{1i}, Y_{1i}, Z_{1i})T$ are the 3D coordinates of moving object features from the first frame, i.e. a frame at time t, $(X_{2i}, Y_{2i}, Z_{2i})T$ are the 3D coordinates of the moving object features from the second frame, i.e. a frame at time t+1, $R_{ij}$ is the rotation matrix entry at location (i,j), and $t_i$ is translation matrix entry at location i.

In an embodiment, the 3D translation motion between frames t and t+Δt is calculated as:

$$t_\Delta = \Delta \cdot t.$$

In an embodiment, the 3D rotation matrix is calculated using an angle-axis representation.

In an embodiment, in the angle axis representation, rotation matrix R is represented as a rotation through an angle α around the axis represented by the vector $\vec{v}$;

obtaining the unit rotation axis $\vec{v}$ as the eigenvector corresponding to the unit eigenvalue by solving:

$$(R-I)v=0.$$

In an embodiment, from the rotation matrix $R(\alpha, \vec{v})$, the angle of rotation, α, is determined as follows:

$$\cos(\alpha) = \frac{1}{2} \cdot (\text{trace}(R) - 1)$$

$$\sin(\alpha) = \frac{1}{2} \cdot v^T \vec{v}, \quad \vec{v} = \begin{pmatrix} R_{32} - R_{23} \\ R_{13} - R_{31} \\ R_{21} - R_{12} \end{pmatrix}$$

$$\alpha = \tan^{-1}\left(\frac{\sin(\alpha)}{\cos(\alpha)}\right)$$

and
in which the rotation matrix $R_\Delta$ is obtained by the following relation:

$$R_\Delta = R(\Delta \cdot \alpha, \vec{v}).$$

In an embodiment, Δ=½, such that the determined position of the objects is midway between the position in each of the first and second frames.

In an embodiment, the method comprises using the rotation matrices R and translation matrices t in respect of all objects within a frame to calculate the 3D positions of the objects within an intermediate frame and using the calculated positions to reconstruct the interpolated frame.

In an embodiment, the 3D position of objects within the interpolated frame are determined, the method comprising the step of projecting the 3D position of the objects onto any 2D image plane of a multiview set to thereby generate the interpolated frame at desired time instant and view.

In an embodiment, the position of objects in the frame is determined at a time temporally closer to one of the first and second frames than to the other.

In an embodiment, R and t are estimated using a RANSAC algorithm.

In an embodiment, the movement matrices are determined based on the first or second frame as starting point in dependence on the temporal separation of the desired interpolated frame from the first or second frame.

In an embodiment, the movement matrices are determined based on both the first and second frame as starting points and determining average matrices based on the movement matrices determined based on the first and second frames for use in the calculation of objects' positions in the interpolated frame.

In an embodiment, the method comprises: segmenting moving objects, by obtaining the differences between consecutive frames by calculating the pixel-wise absolute differences between depth, D, and texture, C, frames at time instants t and t+1:

$$C_D(i,j)=abs(C(i,j,t,n)-C(i,j,t+1,n))$$

$$D_D(i,j)=abs(D(i,j,t,n)-D(i,j,t+1,n))$$

and using these frames calculating a global segmentation map.

In an embodiment, the global segmentation map is calculated as follows:

a pixel at location (i,j) is assigned to background, if it satisfies the condition $$C_D(i,j)+\lambda D_D(i,j)<\text{threshold}$$

in which where, λ and threshold are constants, and assigned to foreground otherwise.

In an embodiment, bi-directional interpolation is performed, the method comprising:

determining backward rotation and translation matrices $R_{backward}$ and $t_{backward}$, such that $$\begin{bmatrix} X_1 \\ Y_1 \\ Z_1 \end{bmatrix} = R_{backward} \begin{bmatrix} X_2 \\ Y_2 \\ Z_2 \end{bmatrix} + t_{backward}$$

wherein, in terms of forward directional rotation matrices R and translation matrices t, $R_{backward}$ and $t_{backward}$ can be obtained as:

$$R_{backward}=R^{-1}$$

$$t_{backward}=-R^{-1}t.$$

In an embodiment, the method comprises:
calculating rotation and translation matrices for a midway temporal location as follows:

$$R_{backward \atop mid} = R_{backward}\left(\frac{\alpha_{backward}}{2}, \vec{v}_{backward}\right)$$

$$t_{backward \atop mid} = \frac{t_{backward}}{2}$$

In an embodiment, any number of frames, n, can be interpolated between frames t and t+1 in an accurate manner, by modifying rotation and translation matrices as follows, $$R_{int} = R\left(\frac{k}{n+1}\alpha, \vec{v}\right),$$

$$t_{int} = \frac{k}{n+1}t \qquad k=1, 2, \ldots n$$

-continued $$R_{int_{backward}} = R_{backward}\left(\left(1 - \frac{k}{n+1}\right)\alpha_{backward}, \vec{v}_{backward}\right),$$

$$t_{int_{backward}} = \left(1 - \frac{k}{n+1}\right)t_{backward}.$$

In an embodiment, the 3D data is 3D depth data and the method comprises determining the 3D depth data in respect of the objects within the frames from multiview video data.

In an embodiment, the 3D data is 3D depth data and the method comprises determining the 3D depth data in respect of the objects within the frames from a monoview 2D video using a depth data extraction algorithm.

According to a second aspect of an embodiment of the invention, there is provided apparatus for up-converting the frame rate of a digital video signal, the apparatus containing a processor and memory programmed to execute the method of the first aspect of the invention.

In an embodiment, the apparatus is a Set Top Box for receiving a digital video signal.

In an embodiment, the processor is a digital signal processor containing function blocks to execute the method steps.

According to a third aspect of an embodiment of the invention, there is provided a television set comprising:

a receiver for receiving a digital television signal;

a display for displaying the images received in the signal; and, a processor arranged to up-convert the frame rate of the received digital video signal in accordance with the method of the first aspect of the invention.

Embodiments of the invention provide a method of frame rate up-conversion in which 3D coordinates of objects within a frame are utilised. This means that with only a single interpolation being done, in 3D space, the projected view of the 3D objects, i.e. each 2D view of a multiview display, can easily be determined. There is no need to perform computationally intensive up-conversion in respect of each of the 2D views in a multiview application. Rather, the interpolation is done "once" in 3D and then 2D projections can easily be taken to provide the 2D up-conversion that may be delivered to a viewer.

The method is applicable wherever 3D data can be obtained regarding the position of an object. It is applicable to monoview and multiview so long as 3D position data is extractable from video.

Preferably, the method comprises determining the 3D position data in respect of the objects within the frames using a calibration matrix in respect of a camera used to capture the frame and a depth map of the frame.

Preferably, the 3D movement matrices comprise a 3D rotation matrix R and a 3D translation matrix t. The use of matrices to quantify and calculate the movement of objects within frames enables simple and easy manipulation of the data to calculate the position of objects within a desired intermediate frame.

Preferably, the method comprises using the rotation matrices R and translation matrices t in respect of all objects within a frame to calculate the 3D positions of the objects within an intermediate frame and using the calculated positions to reconstruct the interpolated frame.

Preferably, the 3D position of objects within the interpolated frame are determined, the method comprising the step of projecting the 3D position of the objects onto any 2D image plane of a multiview set to thereby generate the interpolated frame at desired time instant and view.

Thus, by performing the interpolation calculations based on the 3D position or depth of objects within the frame, a true interpolated position in 3D can be calculated. Once this has been done, any desired 2D projection can be taken so that any corresponding view from a multiview set can be produced.

In one embodiment, the position of objects in the frame is determined at a time temporally closer to one of the first and second frames than to the other.

This is particularly advantageous dependent on where, in time, the interpolated frame is to be placed. If the interpolation is performed starting from the first frame, say at time t, the closer in time to t the interpolated frame is, the better the results will be.

In one embodiment, the movement matrices are determined based on both the first and second frame as starting points and average matrices are determined based on the movement matrices determined based on the first and second frames for use in the calculation of objects' positions in the interpolated frame.

More accurate results can thus be achieved by performing two interpolations starting from both of the first and second frames. Some average or weighted values for the matrices actually to be used can be determined. If a frame is to be interpolated at a time, say of t+0.2, then a greater weight can be used for the matrices determined starting from t than for the matrices determined starting from the frame at t+1.

According to the second aspect of an embodiment of the invention, there is provided apparatus for up-converting the frame rate of a digital video signal, the apparatus containing a processor and memory programmed to execute the method of the first aspect of an embodiment of the invention.

Embodiments of the invention provide apparatus by which frame rate up-conversion can be achieved in a computationally efficient manner in which 3D coordinates of objects within a frame are utilised. The apparatus can therefore perform only a single interpolation, in 3D space, such that the projected view of the 3D objects, i.e. each 2D view of a multiview display, can easily be determined. Thus, the apparatus provides a simple and convenient means by which frame rate up-conversion of multiview video can be performed. The apparatus is particularly appropriate for use with multiview television since in multiview television 3D depth data is easily and readily obtained. However, the apparatus is not limited to use with multiview television as any television signal from which 3D data can be retrieved can be used by the apparatus to produce an up-converted television signal.

There is no need to perform computationally intensive up-conversion in respect of each of the 2D views in a multiview application. Rather, the interpolation is done "once" in 3D and then 2D projections can easily be taken to provide the 2D up-conversion that may be delivered to a viewer.

The apparatus can be implemented in a chip or a digital signal processor or any other such appropriate means.

According to the third aspect of an embodiment of the invention, there is provided a television set, comprising: a receiver for receiving a digital television signal; a display for displaying the images received in the signal; and, a processor arranged to up-convert the frame rate of the received digital video signal in accordance with the method of the first aspect of an embodiment of the invention.

According to a fourth aspect of an embodiment of the invention, there is provided computer programme code means, optionally stored on a computer readable medium, which when run on a computer causes the computer to execute the method of any other aspect of the invention. The computer programme code means may be stored on a portable storage medium such as a CD or any other such medium.

According to a fifth aspect of an embodiment of the invention, there is provided a method of generating an interpolated frame for a digital video signal made up of a series of frames, the method comprising: receiving a digital video signal containing a first frame and a second frame; utilising 3D position data in respect of matched objects within first frame and second frame to determine movement for the matched objects; using the determined movement, determining the position of the objects in a temporally intermediate frame.

BRIEF DESCRIPTION OF THE DRAWINGS

Examples of embodiments of the invention will now be described in detail with reference to the accompanying drawings, in which.

Figure 1:
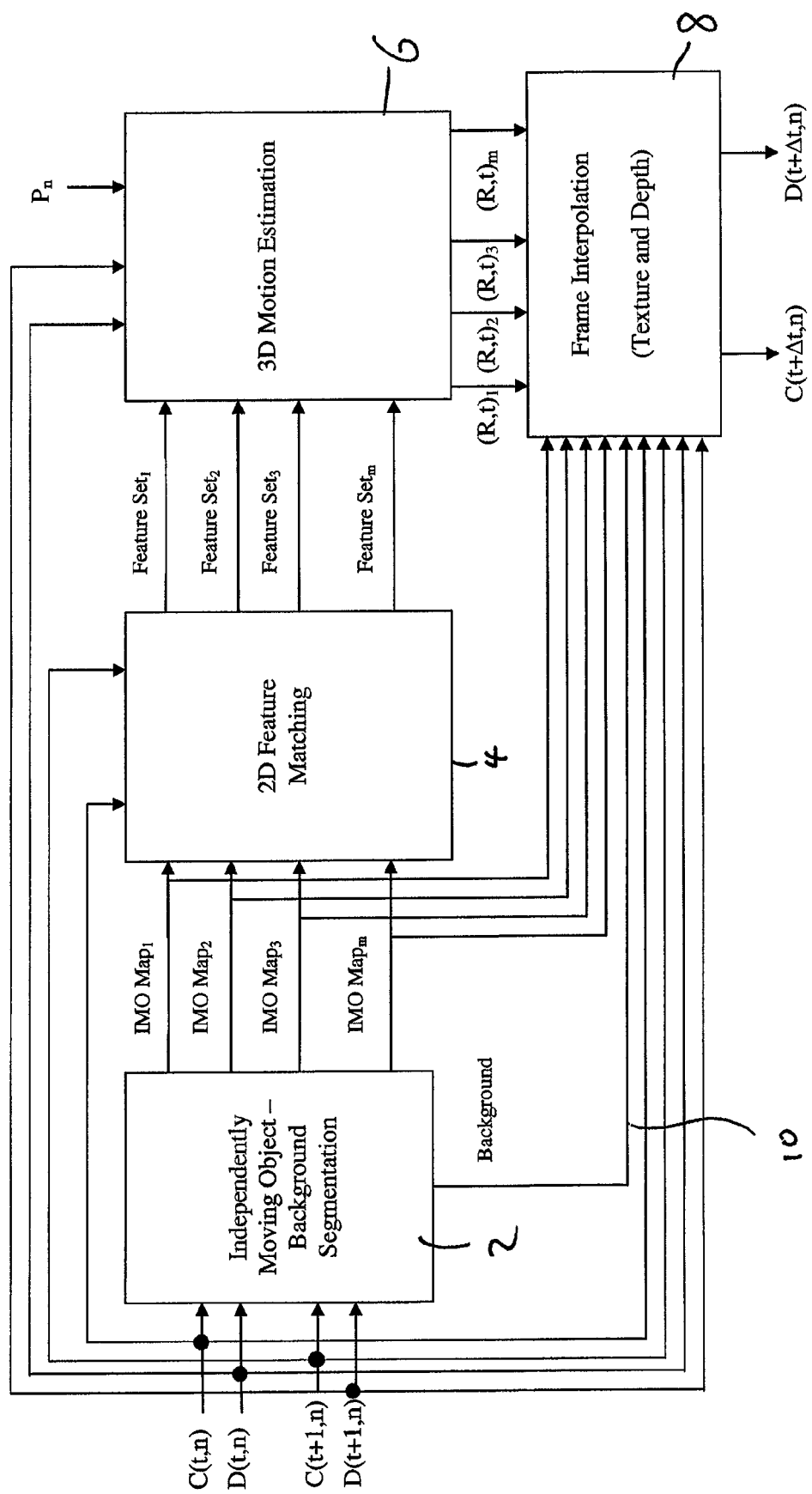
FIG. 1 shows a schematic representation of a flow diagram showing the steps of a method of frame rate up-conversion.

In the method described herein, estimation and utilization of true 3D motion parameters of moving rigid objects is made via 3D scene information. Such information is available in multiview video contents for increasing the frame rates of multiview contents, and hence reduces the motion blur artifacts.

As explained above, there are many available techniques to render inter-frames in between two existing video frames using estimated motion fields, which represent the displacements of blocks or pixels between successive frames. Most of these motion-compensated frame interpolation techniques utilize 2D translational motion models. However, this can be inaccurate as inevitably estimations are made as the 2D image is in fact representing a 3D moving object.

Embodiments of the method involve the following general steps, which will subsequently be described in detail. First, segmentation of independently moving objects (IMOs) is performed between the successive frames, e.g. successive frames of the nth view of a multiview sequence which is to be up-converted. The accuracy of this step can be increased by utilizing the 3D scene information available in multiview video, which is possibly in the form of dense depth maps. The dense depth maps are gray-scale images representing the 3D depth values of the scene points corresponding to each pixel with respect to the capturing camera at each time instant.

Next, the 2D features are matched on the independently moving objects using any feature matching algorithm. Due to its robustness a "SIFT" algorithm is preferably used, described below in detail.

Then, after the corresponding 3D coordinates of the matched features are calculated using camera calibration information, the 3D rigid body motion is estimated in the form of rotation and translation matrices. The parameter estimation can be performed robustly using the RANSAC algorithm for solving the following equation which relates 3D feature coordinates between successive frames and R and t matrices:

$$\begin{bmatrix} X_{11} & Y_{11} & Z_{11} & 0 & 0 & 0 & 0 & 0 & 0 & 1 & 0 & 0 \\ 0 & 0 & 0 & X_{11} & Y_{11} & Z_{11} & 0 & 0 & 0 & 0 & 1 & 0 \\ 0 & 0 & 0 & 0 & 0 & 0 & X_{11} & Y_{11} & Z_{11} & 0 & 0 & 1 \\ \cdots & & & & & & & & & & & \end{bmatrix} \begin{bmatrix} R_{11} \\ R_{12} \\ R_{13} \\ R_{21} \\ R_{22} \\ R_{23} \\ R_{31} \\ R_{32} \\ R_{33} \\ t_1 \\ t_2 \\ t_3 \end{bmatrix} = \begin{bmatrix} X_{21} \\ Y_{21} \\ Z_{21} \\ \cdots \end{bmatrix}$$

Using methods such as SIFT and RANSAC improves the performance of the algorithm significantly and enables the interpolation to be performed effectively and efficiently. However, use of these methods is not essential. What is important is the use of 3D information for frame rate up-conversion.

The rotation and translation parameters between the frames at time instant t and t+Δt (any temporal location in between the successive frames of video sequence) are found, and the 3D coordinates of the moving objects are moved from temporal location t to temporal location t+Δt.

Last, the inter-frame is interpolated by projecting the 3D coordinates of the moving rigid objects at time instant t+Δt to the corresponding image plane, and the background is filled using the segmented background regions of frames at time instants t and t+1.

In an alternative manner, in order to increase the qualities of rendered frames, bi-directional interpolation of the foreground moving objects is performed by additionally using the backward rotation and translation parameters between frames at time instants t+1 and t+Δt.

In greater detail now, first, rigid object motion is modeled in 3D using a Euclidean transformation such as that described in R. I. Hartley and A. Zisserman, "Multiple View Geometry in Computer Vision", Cambridge University Press, second edition, 2004, the entire contents of which are hereby incorporated by reference. In this example the Euclidean transformation is defined as $$\begin{bmatrix} X_2 \\ Y_2 \\ Z_2 \end{bmatrix} = R \begin{bmatrix} X_1 \\ Y_1 \\ Z_1 \end{bmatrix} + t \quad (1)$$

in which $(X_1, Y_1, Z_1)^T$ and $(X_2, Y_2, Z_2)^T$ represent 3D coordinates of an object moving between frames, R is a 3 by 3 rotation matrix, and t is a 3 by 1 translation matrix.

Although only the 2D pixel coordinates of the moving objects are available in video sequences, the utilisation of equation (1) above requires 3D coordinates of the moving objects. In order to obtain the 3D coordinates, the calibration, i.e. projection matrix, of the camera capturing the scene, which defines the projection of 3D world coordinates onto 2D pixel coordinates, as well as the depth map of the scene is needed. Such data can be obtained using the transformations defined in R. I. Hartley and A. Zisserman referred to above.

In one example, equation (2) below is used to relate 2D pixel coordinates with the 3D world coordinates, with the help of a 3 by 4 projection matrix, P, as:

$$x=PX \tag{2}$$

in which
  x represents a 2D pixel, and
  X represents 3D world coordinates, respectively.

Once the 3D coordinates of the moving objects are determined, the frames at any desired time can be interpolated using the estimated rotation, R, and translation, t, matrices, and the projection of the rotated and translated 3D points on the 2D image plane.

There exist algorithms, such as those described in Evren İmre, Aydın Alatan, Sebastian Knorr, Thomas Sikora, "Prioritized Sequential 3D Reconstruction in Video Sequences of Dynamic Scenes", Signal Processing and Communications Applications, 2006, Burak Ozkalayci, Serdar Gedik, Aydin Alatan, "3-D Structure Assisted Reference View Generation for H.264 Based Multi-View Video Coding", PCS, 2007 and Cevahir Cigla, Xenophon Zabulis and A. Aydin Alatan "Region-Based Dense Depth Extraction From Multi-View Video", ICIP 2007 (the entire contents of all of which are hereby incorporated by reference for all purposes), that propose methods for extraction and transmission of 3D scene information via multiple views. Hence, as the ISO MPEG standardization activities to be completed, depth information as well as the projection matrices of the capturing cameras will be all available for the next generation LCD panels. This data format is referred as N-view-plus-N-depth. Consequently, the motion estimation and compensation techniques can be improved to utilize 3D scene information for increasing the frame-rate of multiview sequences to be displayed on next generation multiview displays.

Embodiments of the method can be initiated with the segmentation of moving rigid objects using, e.g., color and depth information. Once the moving foreground objects are segmented, high frequency features on the moving objects are matched between successive frames of the view, which will be up-converted. Any suitable feature matching technique may be used to match objects between frames. One useful example is the Scale Invariant Feature Transform (SIFT) as defined in David G. Lowe, "Distinctive Image Features from Scale-Invariant Keypoints", International Journal of Computer Vision, 2004, the entire contents of which are hereby incorporated by reference for all purposes.

Next, the 3D motion parameters, i.e. 3D rotation and translation matrices, are estimated using a method which relies on Random Sample Consensus (RANSAC) as defined in M. A. Fischler, R. C. Bolles, "Random Sample Consensus: A Paradigm for Model Fitting with Applications to Image Analysis and Automated Cartography", Communications of the ACM, 1981, the entire contents of which are hereby incorporated by reference for all purposes. Finally, the inter-frames at any temporal location between the original video frames are interpolated using the estimated 3D motion parameters.

The steps of the initial moving object segmentation algorithm are provided below:

Taking the example of the nth view of a multiview video, which will be up-converted, the differences between consecutive frames are obtained by calculating the pixel-wise absolute differences between depth, D, and texture, C, frames at time instants t and t+1:

$$C_D(i,j)=abs(C(i,j,t,n)-C(i,j,t+1,n))$$

$$D_D(i,j)=abs(D(i,j,t,n)-D(i,j,t+1,n)) \tag{3}$$

Then, using these frames, a global segmentation map is calculated as follows:

a pixel at location (i,j) is assigned to background, if it satisfies the condition given by (4) below, and assigned to foreground otherwise;

$$C_D(i,j)+\lambda D_D(i,j)<\text{threshold} \tag{4}$$

where, $\lambda$ and threshold are constants which may preferably be determined by trial and error.

After the global segmentation map is determined, the average background depth values of depth maps D(i,j,t,n) and D(i,j,t+1,n) are calculated using the depth values of background pixels.

Finally, the depth values of the pixels at time instants t and t+1, i.e. D(i,j,t,n) and D(i,j,t+1,n), are compared to the average background depth values calculated. The foreground pixels are determined as the pixels having depth values much different from the average depth values.

Using connected component labeling or other suitable such methods, different foreground objects are identified. Once the moving objects are segmented between successive frames of the nth view, the features of moving objects between successive frames are matched using SIFT, described above.

Having matched the features on the moving rigid objects between the successive frames of a specific view to up-convert, the next step is the calculation of rotation and translation parameters of the moving rigid objects. Fortunately, the depth values of all SIFT features are available for the N-view-plus-N-depth content type; hence, the 3D motion estimation step is relatively simple.

For this purpose, the initial step is the determination of the 3D coordinates of the matched features. Thus, the equation for the back-projected ray can be given as defined in Engin Tola, "Multi-view 3D Reconstruction of a Scene containing Independently Moving Objects", MSc. Thesis submitted to The Graduate School of Natural and Applied Sciences of METU, 2004, the entire contents of which are hereby incorporated by reference, as $$X(\lambda)=P^+x+\lambda C \tag{5}$$

in which
  $\lambda$ is a positive number,
  C represents the camera center,
  $P^+$ indicates the pseudo inverse of the projection matrix.

Since $P^+P=I$ and $PC=0$, one obtains, $$PX(\lambda)=x \tag{6}$$

Equation (6) gives the coordinates of the 3D point on the back projection line, and is a function of $\lambda$. This ambiguity is solved by using the known depth of the point, and the exact coordinates are thus calculated.

After determining the 3D coordinates of the matched features, one can solve for R and t in (1) above. In other words, once the 3D coordinates of the matched features have been determined, it is possible to calculate the transformation matrices R and t that must have acted on the coordinates in the first frame to cause the movement of the feature to its position in the second frame.

For convenience, equation (1) is modified to convert the problem to the form Ax=b, as written in (7):

$$\begin{bmatrix} X_{11} & Y_{11} & Z_{11} & 0 & 0 & 0 & 0 & 0 & 0 & 1 & 0 & 0 \\ 0 & 0 & 0 & X_{11} & Y_{11} & Z_{11} & 0 & 0 & 0 & 0 & 1 & 0 \\ 0 & 0 & 0 & 0 & 0 & 0 & X_{11} & Y_{11} & Z_{11} & 0 & 0 & 1 \\ \ldots & & & & & & & & & & & \end{bmatrix} \begin{bmatrix} R_{11} \\ R_{12} \\ R_{13} \\ R_{21} \\ R_{22} \\ R_{23} \\ R_{31} \\ R_{32} \\ R_{33} \\ t_1 \\ t_2 \\ t_3 \end{bmatrix} = \quad (7)$$

$$\begin{bmatrix} X_{21} \\ Y_{21} \\ Z_{21} \\ \ldots \end{bmatrix}$$

in which $(X_{1i}, Y_{1i}, Z_{1i})T$ are the 3D coordinates of moving object features from the first frame, i.e. a frame at time t, $(X_{2i}, Y_{2i}, Z_{2i})T$ are the 3D coordinates of the moving object features from the second frame, i.e. a frame at time t+1, $R_{ij}$ is the rotation matrix entry at location (i,j), and $t_i$ is translation matrix entry at location i.

From the equation 7 in this form it is possible to use know methods to determine estimates for the matrices R and t. One suitable means to do this is to us the known Random Sample Consensus ("RANSAC") algorithm.

Thus, from equation (7), rotation and translation matrices for a rigid body moving between the successive frames of any view can be estimated robustly by using RANSAC.

The RANSAC algorithm includes the following steps:

Select 4 random matches and normalize the points using an algorithm such as that proposed Hartley R., "In Defense of the Eight-Point Algorithm", IEEE Transactions on Patterns Analysis and Machine Intelligence, vol. 19, no. 6, June 1997, the entire contents of which are hereby incorporated by reference for all purposes.

Estimate R and t using a least squares method,

Using a method such as that described in Challis J. H., "A Procedure for Determining Rigid Body Transformation Parameters", Journal of Biomechanics, 1995, the entire contents of which are hereby incorporated by reference for all purposes, the nearest ideal rotation matrix is found using the estimated R. An estimate for t is then updated accordingly.

Using the estimated R and t, the 3D coordinates of the features at the first frame are rotated and translated.

Ideally these rotated and translated 3D coordinates should directly match to 3D coordinates of the features at the second frame. However, due to the errors in feature matching and rotation-translation parameter estimation, there will quite possibly be a certain distance between these two 3D point sets.

The Euclidean distance between real 3D coordinates of the features at the second frame, and the 3D coordinates obtained by rotating and translating those of features at the first frame is calculated. Next, the number of inliers is counted by comparing the Euclidean distances with some defined threshold. If the number of inliers is greater than a defined maximum number of inliers, then the maximum iteration number, N, is updated, using $$N = \frac{\log(1-p)}{\log(1-(1-e)^s)}. \quad (8)$$

This ensures, that with a probability p, at least one of the random samples of s points is free from outliers.

The number of iterations is increased by 1, and is terminated if maximum number of iterations is reached. Otherwise, the process is repeated.

After all the steps thus far described have been performed, namely foreground-background segmentation and 3D motion estimation of foreground rigid objects, a useful and accurate estimate has been obtained for the rotation and translation matrices for each object within a frame. These matrices can now be used to determine the position of the respective object in an interpolated frame. The next step is therefore the step of generation of an interpolated middle frame.

Hence, all 3D points on the foreground objects are rotated and translated to their desired locations in accordance with the determined matrices. These 3D points are projected to an image plane for the time instant t+½. As explained below, where an interpolated frame at a position other than midway between frames t and t+1 is desired is required, this can easily be achieved.

The 3D motion, i.e. the rotation and translation, parameters are estimated between frames at time instants t and t+1. However, since the new frame is at the time instant t+½, the 3D motion between frames t and t+½ is calculated. The translational motion can be determined easily as below:

$$t_{mid} = \frac{1}{2}t \quad (9)$$

Calculation of $R_{mid}$ requires more computation. Preferably, angle-axis representation is used. In angle axis representation, rotation matrix R is represented as a rotation through an angle α around the axis represented by the vector $\vec{v}$ (see Hartley Zisserman et al referred to above). The unit rotation axis $\vec{v}$ can be obtained as the eigenvector corresponding to the unit eigenvalue by solving:

$$(R-I)v = 0 \quad (10)$$

From the rotation matrix $R(\alpha, \vec{v})$, the angle of rotation, α, is determined as follows:

$$\cos(\alpha) = \frac{1}{2}(\text{trace}(R) - 1) \quad (11)$$

$$\sin(\alpha) = \frac{1}{2}v^T\hat{v}, \quad \hat{v} = \begin{pmatrix} R_{32} - R_{23} \\ R_{13} - R_{31} \\ R_{21} - R_{12} \end{pmatrix}$$

$$\alpha = \tan^{-1}\left(\frac{\sin(\alpha)}{\cos(\alpha)}\right)$$

in which "trace(R)" (R being a 3-by-3 square matrix) is the sum of the elements on the main diagonal, i.e. the diagonal from the upper left to the lower right.

Next, the rotation matrix $R_{mid}$ is obtained by the following relation:

$$R_{mid} = R\left(\frac{\alpha}{2}, \vec{v}\right) \quad (12)$$

Once $R_{mid}$ has been determined, 3D foreground points at frame t are rotated and translated as given by the following relation:

$$\begin{pmatrix} X_{mid} \\ Y_{mid} \\ Z_{mid} \end{pmatrix} = R_{mid} \begin{pmatrix} X_1 \\ Y_1 \\ Z_1 \end{pmatrix} + t_{mid} \quad (13)$$

Thus, the 3D position of objects in an interpolated frame is calculated. Once this is done, it is a relatively simple step to project the 3D points to the desired image plane using the projection matrix of the camera:

$$\begin{pmatrix} x_{mid} \\ y_{mid} \end{pmatrix} = P \begin{pmatrix} X_{mid} \\ Y_{mid} \\ Z_{mid} \end{pmatrix} \quad (14)$$

For interpolating the foreground objects, only the foreground pixels from the frame at time t are utilised via (13) and (14). However, for interpolating the background, the segmentation maps are exploited by assigning the background regions from these two frames after logical OR operation on the masks with the convention that value 1 denotes foreground object. Moreover, for regions that are background in both frames average RGB values are assigned to the corresponding locations.

The method is particularly advantageous for multiview video, since as it is the 3D position of the objects in a frame on which the interpolation is performed, these interpolation steps need only be done once. In other words, it is the real 3D position of the objects in the interpolated frame that is calculated and this 3D interpolated "image" can then be projected any desired way to achieve a 2D interpolation for a particular view. No complex calculation is required to achieve this and the actual interpolation is thus only done once for each interpolated frame.

In some cases it is desired to obtain improved estimations of the position of objects in an interpolated frame. In particular although the example above has been with reference to determining a frame at time t+½, in some cases frames at other temporal positions between two frames might be desired. For example, a frame might be desired at t+0.2 or t+0.8. In these cases the interpolated frame is not equidistant temporally from each of the frames at t and t+1. Even if an interpolated frame is to be calculated for time t+½, there are cases in which a more accurate determination of the interpolated frame might be desired or required. To achieve this, bi-directional interpolation may be performed. This means that as well as or instead of calculating a frame at time t+Δt starting from a frame at time t, the frame at time t+Δt is calculated starting from a frame at time t+1.

For bi-directional interpolation, backward rotation and translation matrices transforming foreground coordinates from frame at time t+1 to frame at time t are calculated, so that $$\begin{bmatrix} X_1 \\ Y_1 \\ Z_1 \end{bmatrix} = R_{backward} \begin{bmatrix} X_2 \\ Y_2 \\ Z_2 \end{bmatrix} + t_{backward} \quad (15)$$

After some algebra, in terms of forward directional rotation and translation matrices R and t, $R_{backward}$ and $t_{backward}$ can be obtained as:

$$R_{backward} = R^{-1}$$

$$t_{backward} = -R^{-1}t \quad (16)$$

As in the case of forward directional interpolation, rotation and translation matrices for desired temporal locations can be calculated as follows:

$$R_{backward \atop mid} = R_{backward}\left(\frac{\alpha_{backward}}{2}, \vec{v}_{backward}\right) \quad (17)$$

$$t_{backward \atop mid} = \frac{t_{backward}}{2}$$

Furthermore, since the estimates of real 3D motion is utilized for frame interpolation, any number of frames, n, can be interpolated between frames t and t+1 in an accurate manner, by modifying rotation and translation matrices as follows, $$R_{int} = R\left(\frac{k}{n+1}\alpha, \vec{v}\right), \quad (18)$$

$$t_{int} = \frac{k}{n+1}t$$

$$k = 1, 2, \ldots n$$

$$R_{int \atop backward} = R_{backward}\left(\left(1 - \frac{k}{n+1}\right)\alpha_{backward}, \vec{v}_{backward}\right),$$

$$t_{int \atop backward} = \left(1 - \frac{k}{n+1}\right)t_{backward}$$

Finally, for multiview applications the depth map videos is preferably also be up-converted. This requires the estimation of inter-frames in between the existing dense depth maps at time instants t and t+1. The rotation and translation matrices given by (18) can be utilized for rendering the depth maps, since independently moving objects have the same 3D motion in color and depth sequences. Depth sequences are treated as single channel videos and rendering is performed accordingly.

The proposed method works when 3D scene information is available in the form of depth maps. However, it can also be used in other cases. For example, with conventional 2D video, i.e. monoview, depth information may be extracted using an appropriate module or application. Once the depth information has been extracted the method, as described above, is applicable. In addition, in a multiview system in which the same scene is captured by multiple cameras but no depth maps are available, the depth information may again be extracted using an appropriate module or application and then the method, as described above, is applicable.

With reference now to FIG. 1, there is shown a schematic representation of a flow diagram showing the steps of a method of frame rate up-conversion for a view n of a multi-view television system. The method and apparatus operates by receiving a first video signal at a first frame rate, calculating an interpolated frames, and then preferably producing as an output a second video signal at a higher frame rate than the received input video signal. Thus, the received video signal has been up-converted.

It will be appreciated that where the method is implemented on a digital signal processor, a chip or other such means the blocks in FIG. 1 represent functional components of the DSP. Considering the Figure first as a flow diagram showing the steps of a method, initially, the step of Independent Moving Object Background Segmentation 2 is performed. Received as inputs to this process step are the values for depth, D, and texture, C, of frames at times t and t+1 for a view n. A number of Maps are generated representative of the moving objects and these are provided to a 2D feature matching function that matches the features from the frames at times t and t+1.

At step 4, matching is done between image regions in the frames at t and t+1. In other words, image objects and corresponding defining coordinates are identified for each of the moving objects 1 to m and passed on to block 6 as the corresponding Feature Sets.

At step 6, 3D motion estimation is performed as described above, in that values are calculated for the matrices R and t for each of the objects 1 to m. The step receives as inputs the coordinates from points in $IMOMap_1$, referred to as "Feature $Set_1$", and corresponding coordinates from the frames t and t+1 in respect of each of the other objects 2 to m. The 3D motion estimation serves to determine the matrices R and t in respect of each of the moving objects 1 to m. Thus, as is shown schematically, m sets of matrices R and t are provided by the 3D motion estimation block to a Frame Interpolation block 8.

The Frame Interpolation block 8, generates the image signal that is representative of the interpolated frame including both texture C and depth D data for the frame at time t+Δt.

As can be seen, background data 10 is provided directly from the Independent Moving Object Background Segmentation 2 to the Frame Interpolation block 8. This is because the background data is not taken into account during the motion estimation as, by definition, it is not undergoing motion.

Where the Figure is interpreted as a block diagram of the components in the DSP, the DSP comprises first an Independent Moving Object Background Segmentation unit 2 arranged to receive as inputs values for depth, D, and texture, C, of frames at times t and t+1 for a view n. The Independent Moving Object Background Segmentation unit 2 generates a number of Maps representative of the moving objects and these are provided to a 2D Feature Matching unit 4 that matches the features from the frames at times t and t+1.

Matching is done between image regions in the frames at t and t+1. In other words, image objects and corresponding defining coordinates are identified for each of the moving objects 1 to m and passed on to 3D Motion Estimation Unit 6 as corresponding Feature Sets.

The 3D Motion Estimation Unit 6 estimates motion as described above, in that values are calculated for the matrices R and t for each of the objects 1 to m. The 3D Motion Estimation unit 6 serves to determine the matrices R and t in respect of each of the moving objects 1 to m. A number, m, of sets of matrices R and t are provided by the 3D Motion Estimation unit to a Frame Interpolation unit 8 which generates the interpolated frame for presentation to a user, i.e. for positioning temporally between frames at t and t+1 for display or arrangement in an output data stream.

Figure 2:
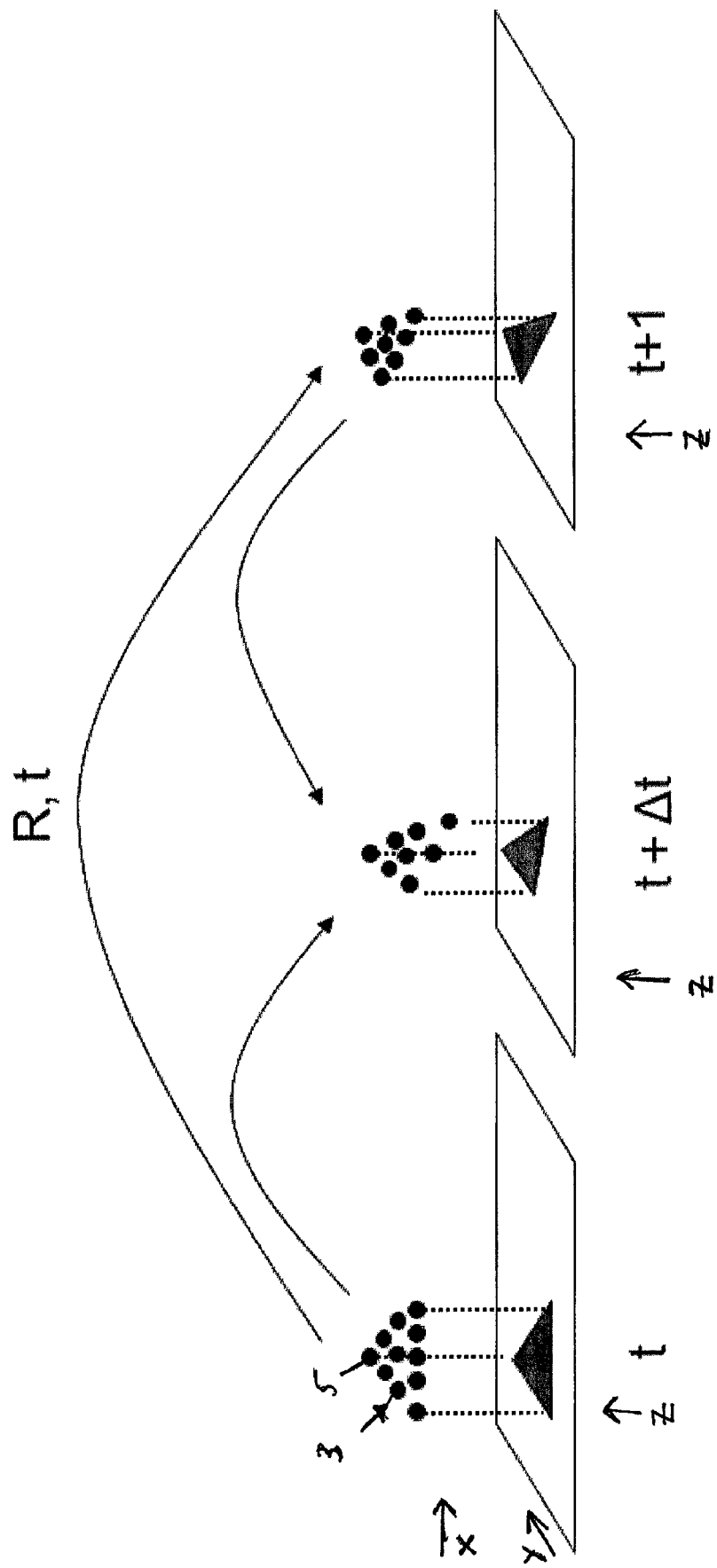
FIGS. 2A to 2C show three schematic representations of 3D scenes including a moving object; and, FIG. 3 shows a schematic representation of a digital television receiver for use in up-converting the frame rate of a received digital television signal.

FIGS. 2A to 2C show schematic representations of 3D scenes including a moving object. In FIG. 2A the position of an object 3 is shown at a time t. The projection of the image can be seen from the direction Z. In FIG. 2C the position of the object 3 is shown at a time t+1. As can be seen, the view from the direction z has changed accordingly. In FIG. 2B the position of the object 3 is shown at a time t+Δt. The 3D position of the object is intermediate between the positions at times t and t+1. The image, as seen by a user, i.e. the projection from the direction Z is also intermediate between the positions of the object as seen in the projections at times t and t+1.

The object is identified by a number of points on the rigid body, shown as circles 5. The movement of the object has been moved under action of the vectors R and t, which may have been calculated as described above. It will be appreciated that since the 3D position of the object 3 has been determined at time t+Δt, it is a relatively simple task to obtain the 2D projection of the object from any desired view, i.e. x or y or any combination, to a camera location.

If conventional methods of frame rate up-conversion were utilised a separate set of calculations would be needed for each of the interpolation directions. Using the present method, the interpolation is done in 3D and so this single interpolation can be used to determine the projections from any desired direction.

Figure 3:
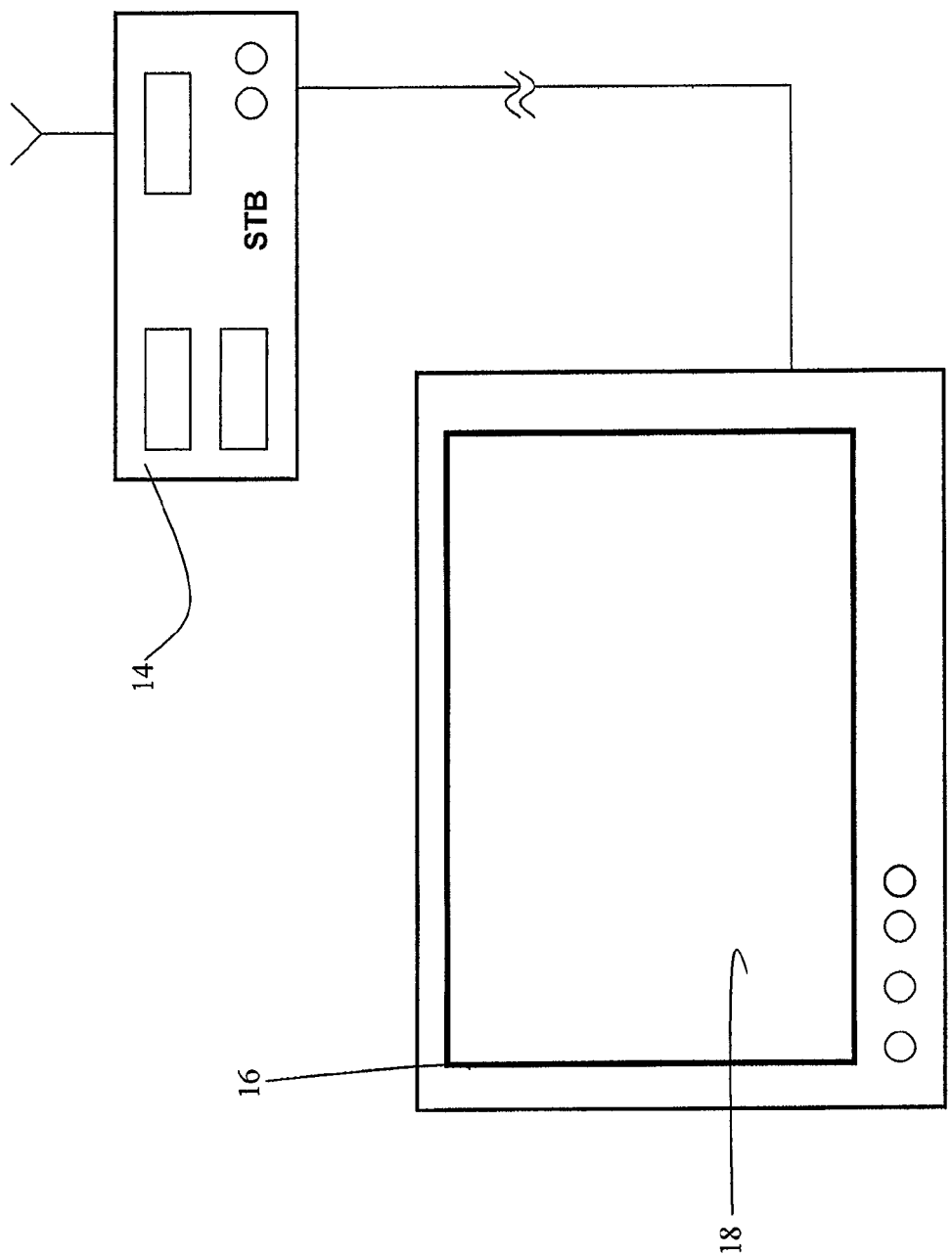

FIG. 3 shows a schematic representation of a digital television receiver system for use in up-converting the frame rate of a received digital television signal. A Set Top Box (STB) 14 is provided arranged to receive a digital television signal, e.g. from a broadcaster. A conventional television 16 is provided with a display screen 18. the STB 14 is arranged to receive a digital television signal containing an encoded digital television signal at a first frame rate. The STB is provided with circuitry to execute the method of frame rate up-converting as described above. In one example, the circuitry is a programmed chip within the STB with programme code stored thereon that when run executes the method described above.

In the example shown, a separate STB 14 is provided connected to a television. It will be appreciated that the functionality of the STB 14 may easily be incorporated into the television 16 itself.

Embodiments of the invention have been described with particular reference to the examples illustrated. However, it will be appreciated that variations and modifications may be made to the examples described within the scope of the invention.

The invention claimed is:

1. A method of up-converting a frame rate of a digital video signal, the method comprising:
receiving a digital video signal containing a plurality of temporally spaced apart image frames in one view of a multiview set, the plurality of temporally spaced apart image frames include two consecutive frames comprising a first frame and a second frame;
finding in one of the received frames, a match for an object in the other of the received frames;
utilizing three-dimensional (3D) data in respect of the matched object within the received frames to determine 3D movement matrices for the matched object;
using the 3D movement matrices, determining a temporally intermediate 3D position of the matched object with respect to the received frames to enable an interpolated frame to be generated temporally between the first and second frame; and
projecting the 3D position of the matched object onto any two-dimensional view of the multiview set to thereby generate the interpolated frame at a desired time instant and view;
wherein finding a match for an object comprises segmenting a moving object by obtaining the differences between the two consecutive frames by calculating pixel-wise absolute differences between depth, D, and texture, C, frames at time instants t and t+1:

$$C_D(i,j)=abs(C(i,j,t,n)-C(i,j,t+1,n))$$

$$D_D(i,j)=abs(D(i,j,t,n)-D(i,j,t+1,n))$$

and using these frames calculating a global segmentation map.

2. The method according to claim 1, further comprising determining the 3D position in respect of the matched object within the received frames using a calibration matrix in respect of a camera used to capture the received frames and a depth map of the received frames.

3. The method according to claim 1, in which the 3D movement matrices comprise a 3D rotation matrix R and a 3D translation matrix T.

4. The method according to claim 3, in which R and T are estimated using a formula of the following form:

$$\begin{bmatrix} X_{11} & Y_{11} & Z_{11} & 0 & 0 & 0 & 0 & 0 & 0 & 1 & 0 & 0 \\ 0 & 0 & 0 & X_{11} & Y_{11} & Z_{11} & 0 & 0 & 0 & 0 & 1 & 0 \\ 0 & 0 & 0 & 0 & 0 & 0 & X_{11} & Y_{11} & Z_{11} & 0 & 0 & 1 \\ \ldots \end{bmatrix} \begin{bmatrix} R_{11} \\ R_{12} \\ R_{13} \\ R_{21} \\ R_{22} \\ R_{23} \\ R_{31} \\ R_{32} \\ R_{33} \\ T_1 \\ T_2 \\ T_3 \end{bmatrix} = \begin{bmatrix} X_{21} \\ Y_{21} \\ Z_{21} \\ \ldots \end{bmatrix},$$

in which:
$(X_{1l}, Y_{1l}, Z_{1l})^T$ are the 3D coordinates of moving object features from the first frame, i.e. a frame at time t;
$(X_{2l}, Y_{2l}, Z_{2l})^T$ are the 3D coordinates of the moving object features from the second frame, i.e. a frame at time t+1;
$R_{ij}$ is the rotation matrix entry at location (i, j); and
$T_i$ is the translation matrix entry at location i.

5. The method according to claim 3, in which a 3D translation matrix (TA) for a 3D translation motion between frames at time t and at time t+Δt is calculated as:

$$T_\Delta = \Delta t \cdot T,$$

where Δt is between 0 and 1.

6. The method according to claim 5, in which Δ=½, such that the determined position of the matched object is midway between the 3D positions of the matched object in each of the first and second frames.

7. The method according to claim 3, in which R is calculated using an angle-axis representation.

8. The method according to claim 7, in which in the angle-axis representation, R is represented as a rotation through an angle a around an axis represented by a vector $\vec{v}$, the method further comprising:

obtaining the unit rotation axis $\vec{v}$ as an eigenvector corresponding to a unit eigenvalue by solving:

$$(R-I)\vec{v}=0,$$

wherein I is defined as an identity matrix.

9. The method according to claim 8, in which from R, the angle of rotation, α, is determined as follows:

$$\cos(\alpha) = \frac{1}{2}(\text{trace}(R) - 1)$$

$$\sin(\alpha) = \frac{1}{2} v^T \hat{v}, \quad \hat{v} = \begin{pmatrix} R_{32} - R_{23} \\ R_{13} - R_{31} \\ R_{21} - R_{12} \end{pmatrix}$$

$$\alpha = \tan^{-1}\left(\frac{\sin(\alpha)}{\cos(\alpha)}\right)$$

and in which a rotation matrix $R_\Delta$ is obtained by the following relation:

$$R_\Delta = (\Delta \cdot \alpha, \vec{v}).$$

10. The method according to claim 3, further comprising using the rotation matrices R and translation matrices T in respect of the matched object within a frame to calculate the 3D position of the matched object within an intermediate frame and using the calculated position to reconstruct the interpolated frame.

11. The method according to claim 3, in which bi-directional interpolation is performed, the method further comprising:
determining backward rotation and translation matrices $R_{backward}$ and $T_{backward}$, such that $$\begin{bmatrix} X_1 \\ Y_1 \\ Z_1 \end{bmatrix} = R_{backward} \begin{bmatrix} X_2 \\ Y_2 \\ Z_2 \end{bmatrix} + T_{backward}$$

wherein, in terms of forward directional rotation matrices R and translation matrices T, $R_{backward}$ and $T_{backward}$ can be obtained as:

$$R_{backward} = R^{-1}$$

$$T_{backward} = -R^{-1}T.$$

12. The method according to claim 11, further comprising: calculating rotation and translation matrices for a midway temporal location as follows:

$$R_{backward\atop mid} = R_{backward}\left(\frac{\alpha_{backward}}{2}, \vec{v}_{backward}\right)$$

$$T_{backward\atop mid} = \frac{T_{backward}}{2}.$$

13. The method according to claim 11, in which any number of frames, n, can be interpolated between frames t and t+1 in an accurate manner, by modifying rotation and translation matrices as follows, $$R_{int} = R\left(\frac{k}{n+1}\alpha, \vec{v}\right),$$

-continued $$T_{int} = \frac{k}{n+1}T$$

$$k = 1, 2, \ldots n$$

$$R_{int\,backward} = R_{backward}\left(\left(1 - \frac{k}{n+1}\right)\alpha_{backward}, \hat{v}_{backward}\right),$$

$$T_{int\,backward} = \left(1 - \frac{k}{n+1}\right)T_{backward}.$$

14. The method according to claim 1, in which the position of the matched object in the interpolated frame is determined at a time temporally closer to one of the first and second frames than to the other.

15. The method according to claim 1, in which the 3D movement matrices are determined based on the first or second frame as starting point in dependence on a temporal separation of a desired interpolated frame from the first or second frame.

16. The method according to claim 1, in which the 3D movement matrices are determined based on both the first and second frame as starting points, the method further comprising determining average matrices based on the 3D movement matrices for use in the determination of the position of the matched object in the interpolated frame.

17. The method according to claim 1, in which the global segmentation map is calculated as follows:
a pixel at location (i,j) is assigned to background, if it satisfies the condition $$C_D(i,j) + \lambda D_D(i,j) < \text{threshold}$$

in which where, λ and threshold are constants, and assigned to foreground otherwise.

18. The method according to claim 1, wherein the 3D data is 3D depth data and the method comprises determining the 3D depth data in respect of the matched object within the frames from multiview video data or from a monoview 2D video using a depth data extraction algorithm.

19. The method as claimed in claim 1, further comprising:
using the 3D movement matrices and the 3D position of the matched object in one of the received frames, interpolating a 3D position of the matched object at the time of the other received frame;
comparing the interpolated 3D position at the time of the other received frame and the 3D position of the matched object in the other received frame; and
modifying the 3D movement matrices based on the comparison;
wherein determining the 3D position of the matched object in a temporally intermediate frame is based on the modified 3D movement matrices.

20. An apparatus for up-converting a frame rate of a digital video signal, the apparatus containing a processor and memory programmed to execute the method of claim 1.

21. The apparatus according to claim 20, in which the apparatus is a Set Top Box for receiving a digital video signal.

22. The apparatus according to claim 20, in which the processor is a digital signal processor containing function blocks to execute the method steps of claim 1.

23. A television set comprising:
a receiver for receiving a digital video signal;
a display for displaying images received in the digital video signal; and,
a processor arranged to up-convert a frame rate of the received digital video signal in accordance with the method of claim 1.

24. A method of up-converting the frame rate of a digital video signal, the method comprising:
receiving a digital video signal containing a plurality of temporally spaced apart image frames in one view of a multiview set, the plurality of temporally spaced apart image frames include two consecutive frames comprising a first frame and a second frame, each frame having an associated time and comprising one or more three-dimensional (3D) objects having a position;
finding in one of the received frames, matches for the one or more objects in the other of the received frames;
utilizing 3D data in respect of the one or more matched objects within the received frames to determine 3D movement matrices for the one or more matched objects;
using the 3D movement matrices and the 3D position of the one or more matched objects in one of the received frames, interpolating a 3D position of the one or more matched objects at the time of the other received frame;
comparing the interpolated 3D position at the time of the other received frame and the 3D position of the one or more matched objects in the other received frame;
modifying the 3D movement matrices based on the comparison; and
using the modified 3D movement matrices, determining the position of the one or more matched objects in three dimensions in a temporally intermediate frame to enable an interpolated frame in any two-dimensional view of the multiview set to be generated temporally between the first and second frame;
wherein finding a match for an object comprises segmenting a moving object by obtaining the differences between the two consecutive frames by calculating pixel-wise absolute differences between depth, D, and texture, C, frames at time instants t and t+1:

$$C_D(i,j) = abs(C(i,j,t,n) - C(i,j,t+1,n))$$

$$D_D(i,j) = abs(D(i,j,t,n) - D(i,j,t+1,n))$$

and using these frames calculating a global segmentation map.

* * * * *